(12) United States Patent
Kim et al.

(10) Patent No.: US 8,459,576 B2
(45) Date of Patent: Jun. 11, 2013

(54) DUAL FUEL INJECTOR FOR A COMMON RAIL SYSTEM

(75) Inventors: Hoisan Kim, Dunlap, IL (US); Mark Sommars, Sparland, IL (US); Xiangdong Ding, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 259 days.

(21) Appl. No.: 13/014,326

(22) Filed: Jan. 26, 2011

(65) Prior Publication Data

US 2012/0187218 A1   Jul. 26, 2012

(51) Int. Cl.
*F02M 51/06* (2006.01)
*F02M 21/00* (2006.01)
*F02M 47/02* (2006.01)
*F02M 43/04* (2006.01)
*F02M 21/02* (2006.01)

(52) U.S. Cl.
USPC .......... 239/585.1; 239/88; 123/299; 123/304; 123/525

(58) Field of Classification Search
USPC .......... 239/5, 88–92, 96, 417.5, 585.1–585.5; 123/299, 304, 525, 526, 575, 576
See application file for complete search history.

(56) References Cited

U.S. PATENT DOCUMENTS

| 4,499,862 | A | 2/1985 | Baumer et al. |
| 4,700,672 | A | 10/1987 | Baguena |
| 5,199,398 | A * | 4/1993 | Nylund .................. 123/299 |
| 6,073,862 | A * | 6/2000 | Touchette et al. ............ 239/408 |
| 6,328,230 | B1 | 12/2001 | Prillwitz et al. |
| 6,336,598 | B1 * | 1/2002 | Touchette et al. ............ 239/408 |
| 6,761,325 | B2 * | 7/2004 | Baker et al. ............... 239/533.3 |
| 7,124,959 | B2 * | 10/2006 | Baker et al. ....................... 239/5 |
| 7,373,931 | B2 * | 5/2008 | Lennox et al. ................ 123/525 |
| 7,556,017 | B2 | 7/2009 | Gibson |
| 2002/0070295 | A1 | 6/2002 | Baker et al. |
| 2007/0199539 | A1 | 8/2007 | Lennox et al. |

FOREIGN PATENT DOCUMENTS

| EP | 610585 | 9/1996 |
| EP | 778410 | 6/1997 |
| EP | 2487353 | 8/2012 |
| GB | 549419 | 11/1942 |
| JP | 61229969 | 10/1986 |
| JP | 63208664 | 8/1988 |

\* cited by examiner

*Primary Examiner* — Darren W Gorman
(74) *Attorney, Agent, or Firm* — Carl E. Myers

(57) ABSTRACT

A dual fuel common rail fuel injector includes a first and second control valve assembly and a first and second check needle. The dual fuel injector is capable of selectively injecting two different fuels such as diesel and liquid natural gas. The first and second control valve assemblies operate using a single fuel, such as diesel, as the control medium. The dual fuel common rail injector further includes a hydraulic lock assembly.

18 Claims, 5 Drawing Sheets

DUAL FUEL INJECTOR FOR A COMMON RAIL SYSTEM

TECHNICAL FIELD

The present disclosure relates generally to dual fuel common rail systems, and more particularly to a fuel injector configured to receive two separate fluids and selectively inject the fluids independent of one another.

BACKGROUND

Gaseous fuel engines are known for their ability to burn relatively clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. Fuel systems capable of independently injecting both a gaseous fuel and a diesel fuel in a manner that is both safe and efficient has proven to be elusive. U.S. Pat. No. 4,499,862 issued to Baumer, et al. sought to address this issue. However, this reference fails to teach an injector that can independently receive two fluids, keep those fluids separate, and independently control the injection of the fluids.

The present disclosure is directed toward one or more of the problems set forth above.

SUMMARY OF THE DISCLOSURE

In one aspect, a dual fuel injector includes an injector body defining a dual fuel inlet configured to receive high pressure diesel fuel and medium pressure gaseous fuel, a medium pressure gaseous supply passage, a high pressure diesel supply passage, at least one low pressure drain, a diesel check cavity, a gaseous check cavity, at least one diesel nozzle outlet, and at least one gaseous fuel nozzle outlet. Also included is a gaseous control valve assembly disposed at least partially within the injector body and having a control valve member that selectively allows fluid communication between the high pressure diesel supply passage and the at least one low pressure drain. The dual fuel injector further includes a diesel control valve assembly disposed at least partially within the injector body and having a control valve member the selectively allows fluid communication between the high pressure diesel supply passage and the at least one low pressure drain. Also included is a diesel check disposed in the diesel check cavity and movable between a first diesel check position wherein the diesel check blocks fluid communication between the high pressure diesel supply passage and the at least one diesel nozzle outlet, and a second diesel check position wherein the diesel check at least partially unblocks fluid communication between the high pressure diesel supply passage and the at least one diesel nozzle outlet, and wherein the movement between the first diesel check position and the second diesel check position is controlled by the diesel control valve assembly. A gaseous check is also included, wherein the gaseous check is disposed in the gaseous check cavity and movable between a first gaseous check position wherein the gaseous check blocks fluid communication between the medium pressure gaseous supply passage and the at least one gaseous nozzle outlet, and a second gaseous check position wherein the gaseous check at least partially unblocks fluid communication between the medium pressure gaseous supply passage and the at least one gaseous nozzle outlet. The dual fuel injector further includes a hydraulic lock in fluid communication with both the high pressure diesel supply passage and gaseous check cavity.

In another aspect, a dual fuel common rail fuel system including a gaseous fuel source, a diesel fuel source, a medium pressure gaseous rail, and a high pressure diesel rail. The dual fuel common rail system further includes at least one gaseous pump configured to pressurize gaseous fuel from the gaseous fuel source to a medium pressure and deliver medium pressure gaseous fuel to the medium pressure diesel gaseous rail. Also included is at least one diesel pump configured to pressurize diesel fuel from the diesel fuel source to a high pressure and deliver high pressure diesel fuel to the high pressure diesel rail. The dual fuel common rail fuel system further includes a quill configured to receive both medium pressure gaseous fuel from the medium pressure gaseous rail and high pressure diesel from the high pressure diesel rail. The dual fuel common rail fuel system also includes a dual fuel injector configured to receive both medium pressure gaseous fuel and high pressure diesel fuel from the quill. The dual fuel injector further includes an injector body defining a dual fuel inlet configured to receive high pressure diesel fuel and medium pressure gaseous fuel, a medium pressure gaseous supply passage, a high pressure diesel supply passage, at least one low pressure drain, a diesel check cavity, a gaseous check cavity, at least one diesel nozzle outlet, and at least one gaseous fuel nozzle outlet. The dual fuel injector also includes a gaseous control valve assembly disposed at least partially within the injector body and having a control valve member that selectively allows fluid communication between the high pressure diesel supply passage and the at least one low pressure drain. Also included is a diesel control valve assembly disposed at least partially within the injector body and having a control valve member the selectively allows fluid communication between the high pressure diesel supply passage and the at least one low pressure drain. A diesel check is also included, wherein the diesel check is disposed in the diesel check cavity and movable between a first diesel check position wherein the diesel check blocks fluid communication between the high pressure diesel supply passage and the at least one diesel nozzle outlet, and a second diesel check position wherein the diesel check at least partially unblocks fluid communication between the high pressure diesel supply passage and the at least one diesel nozzle outlet, and wherein the movement between the first diesel check position and the second diesel check position is controlled by the diesel control valve assembly. Also included is a gaseous check disposed in the gaseous check cavity and movable between a first gaseous check position wherein the gaseous check blocks fluid communication between the medium pressure gaseous supply passage and the at least one gaseous nozzle outlet, and a second gaseous check position wherein the gaseous check at least partially unblocks fluid communication between the medium pressure gaseous supply passage and the at least one gaseous nozzle outlet. Also included is a hydraulic lock in fluid communication with both the high pressure diesel supply passage and gaseous check cavity.

DETAILED DESCRIPTION

Figure 1:
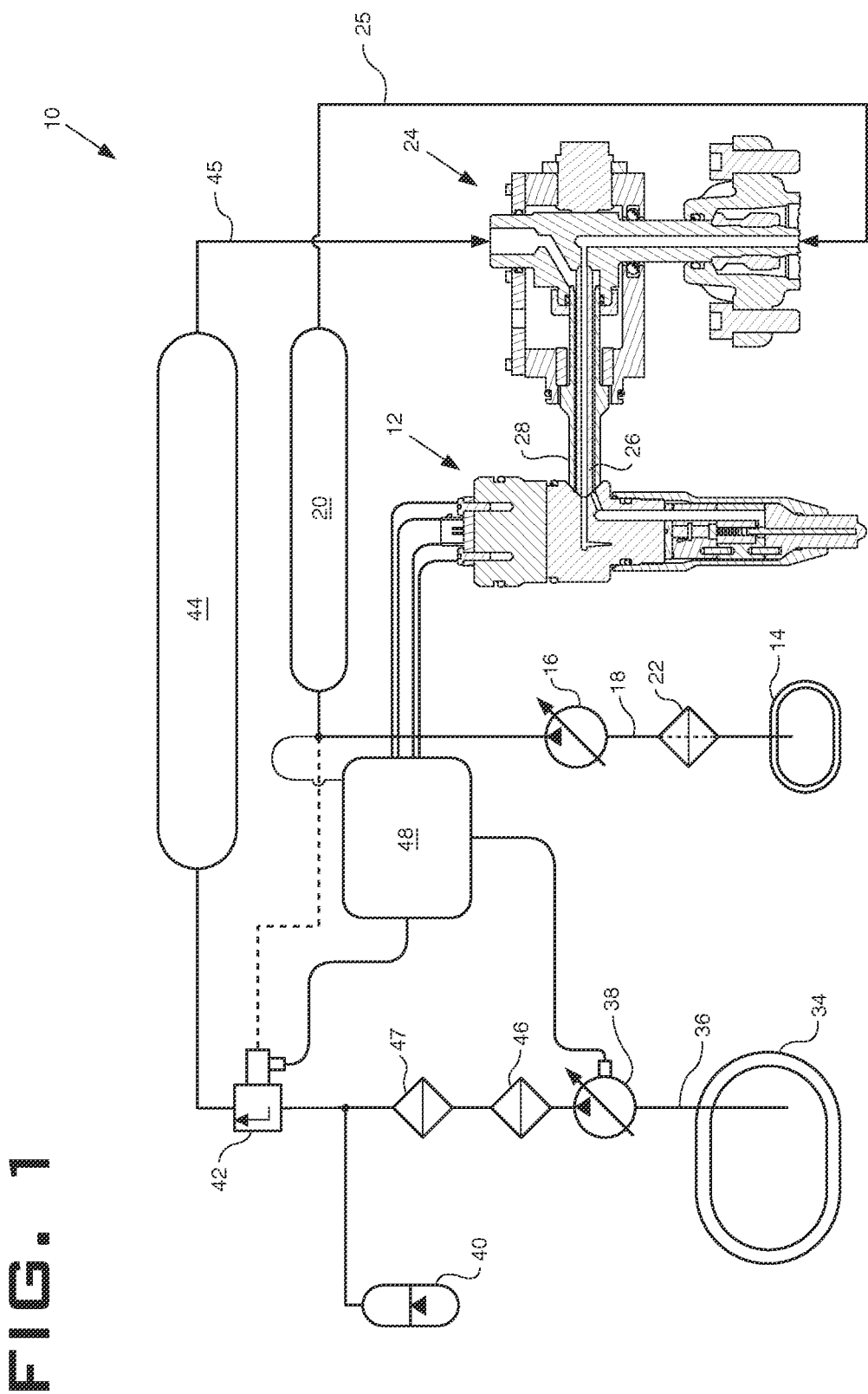
FIG. 1 is a diagrammatic schematic of a fuel system incorporating a dual fuel common rail injector.
Figure 3:
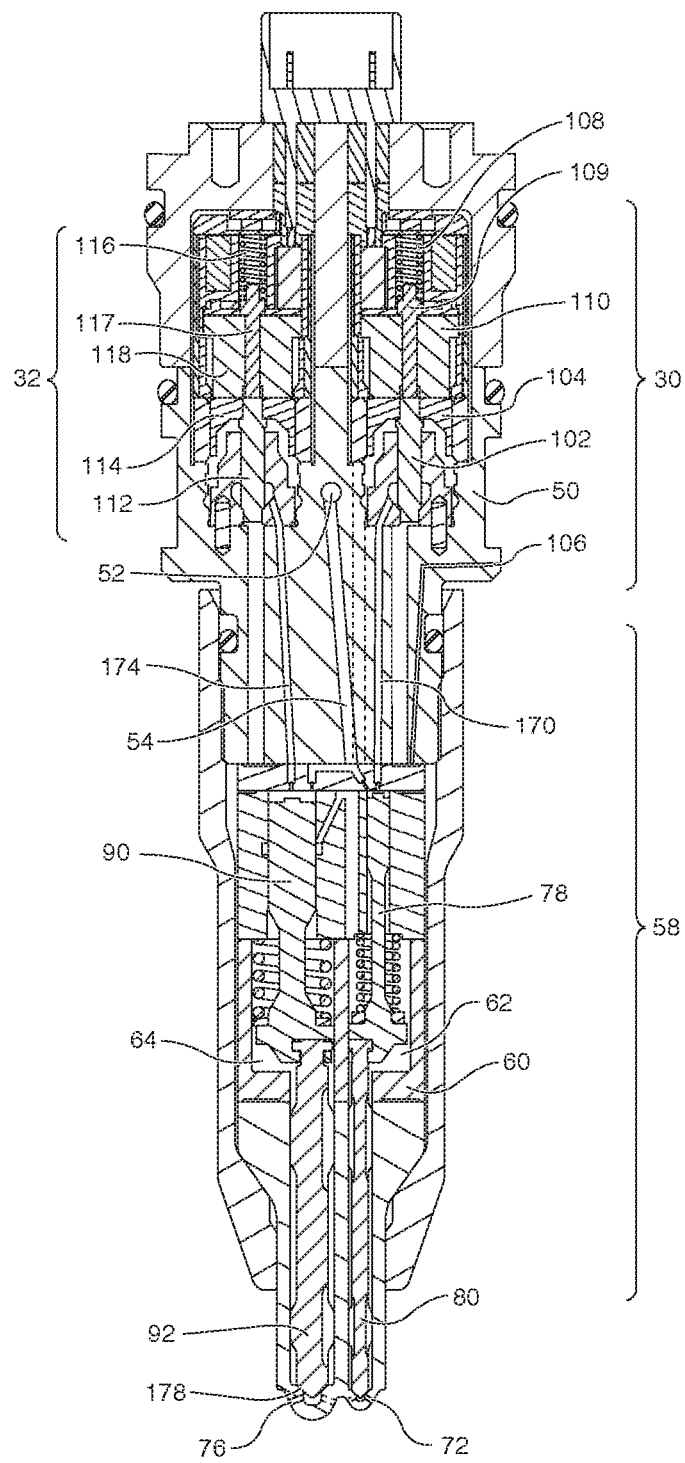
FIG. 3 is a differently oriented cross section of the dual fuel injector according to the first embodiment.
Figure 4:
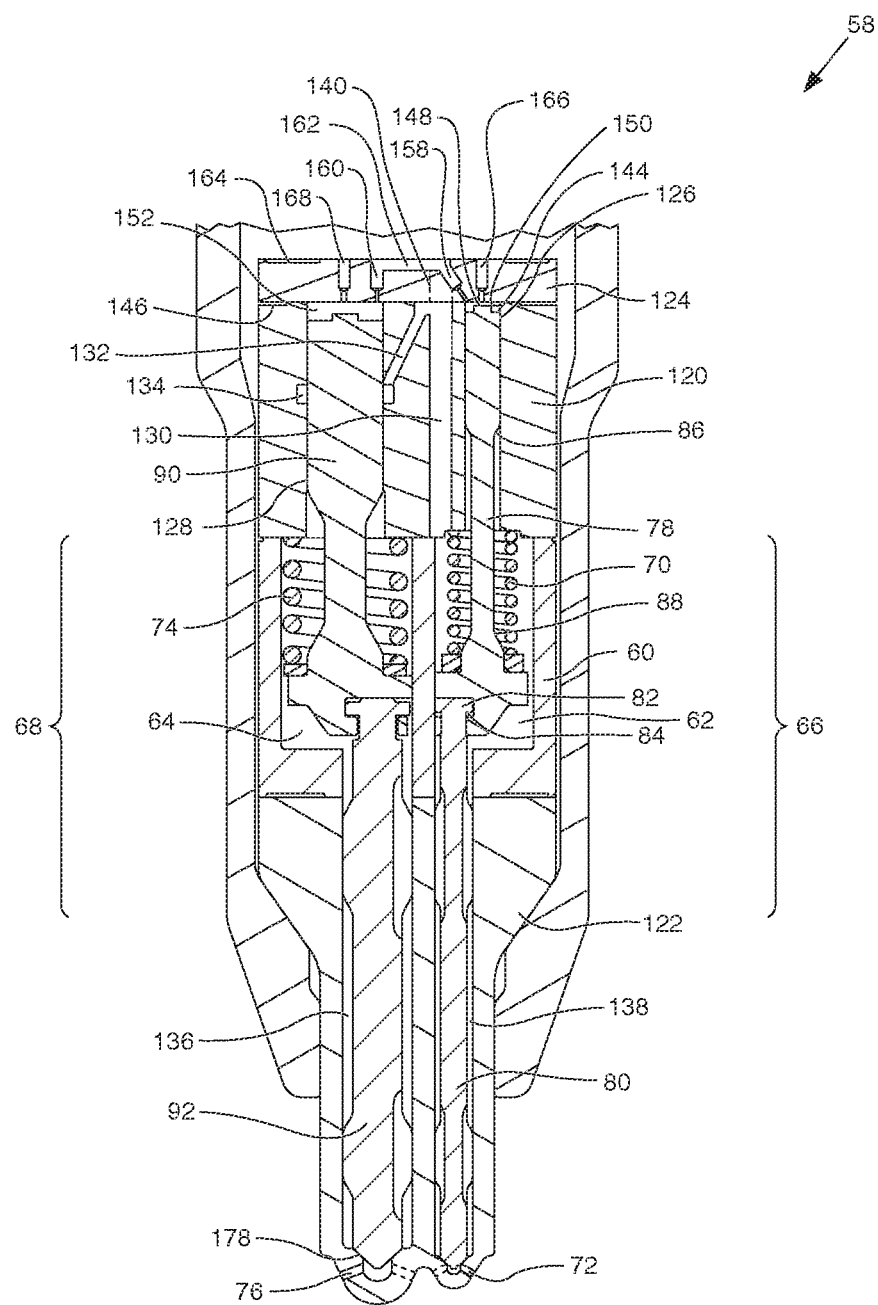
FIG. 4 is a detail of a nozzle group of the dual fuel injector according to the first embodiment.

Referring to FIG. 1, a fuel system 10 utilizing a dual fuel common rail injector 12 is shown. For ease of discussion, the dual fuel common rail injector will be referred to as "injector 12". A diesel fuel source 14 contains diesel fuel. A diesel pump 16 draws diesel fuel through diesel supply line 18; pressurizes the diesel fuel; and delivers the pressurized diesel fuel to a diesel fuel rail 20. A filter 22 may be disposed in the diesel supply line 18 upstream of the diesel pump and downstream of the diesel fuel source 14. Diesel fuel within the diesel fuel rail 20 may be pressurized to a pressure of approximately 40 MPa. Pressurized diesel fuel from the diesel fuel rail 20 may then be delivered to a quill assembly 24 via diesel fuel line 25. Quill assembly 24 is configured to receive both diesel fuel and a gaseous fuel such as liquid natural gas. Those skilled in the art will recognize that the gaseous fuel may be any gaseous fuel such as natural gas, propane, methane, liquefied petroleum gas (LPG), synthetic gas, landfill gas, coal gas, biogas from agricultural anaerobic digesters, or any other gaseous fuel. Quill assembly 24 may further be a coaxial type wherein diesel fuel is disposed within a first tube 26, which is disposed within a second tube 28 also carrying gaseous fuel. Diesel fuel from quill assembly 24 is then delivered to injector 12. As shown in FIGS. 3 and 4, diesel fuel supplied to injector 12 is both injected and also functions as a control medium for the diesel control valve assembly 30 and the gaseous control valve assembly 32 of injector 12.

Fuel system 10 further includes a gaseous fuel source 34. Gaseous fuel, such as liquid natural gas may be stored at relatively low temperatures and pressures (−160° C. and 100 kPa). Because gaseous fuel may be stored under such temperatures and pressures, it may be necessary for the gaseous fuel to be kept in a vacuum insulated tank. Gaseous fuel is drawn from gaseous fuel source 34 through a gaseous supply line 36 by a fuel pump 38. Fuel pump 38 may be a variable displacement cryogenic pump. Fuel pump 38 pressurizes and delivers gaseous fuel to an accumulator 40 via gaseous supply line 36. A filter 46 may filter diesel fuel within gaseous supply line 36. Gaseous supply line 36 may also include a secondary filter 47. A pressure regulator 42 ensures that gaseous fuel delivered to a gaseous fuel rail 44 is at a pressure that is at least 5 MPa below that of the diesel fuel within the diesel fuel rail 20 via gaseous fuel line 45. For example, within the fuel system 10, diesel fuel within the diesel fuel rail 20 may be at a pressure of 40 MPa, while gaseous fuel within the gaseous fuel rail 44 may be at a pressure of 35 MPa.

An electronic control module (ECM) 48 may control various components of fuel system 10. For example, the ECM may control the diesel control valve assembly 30 and the gaseous control valve assembly 32 of injector 12. Likewise, the ECM may also control components such as the diesel pump 16, fuel pump 38, and pressure regulator 42. Those skilled in the art will recognize that fuel system may further include other components that can also be controlled by ECM 48.

Figure 2:
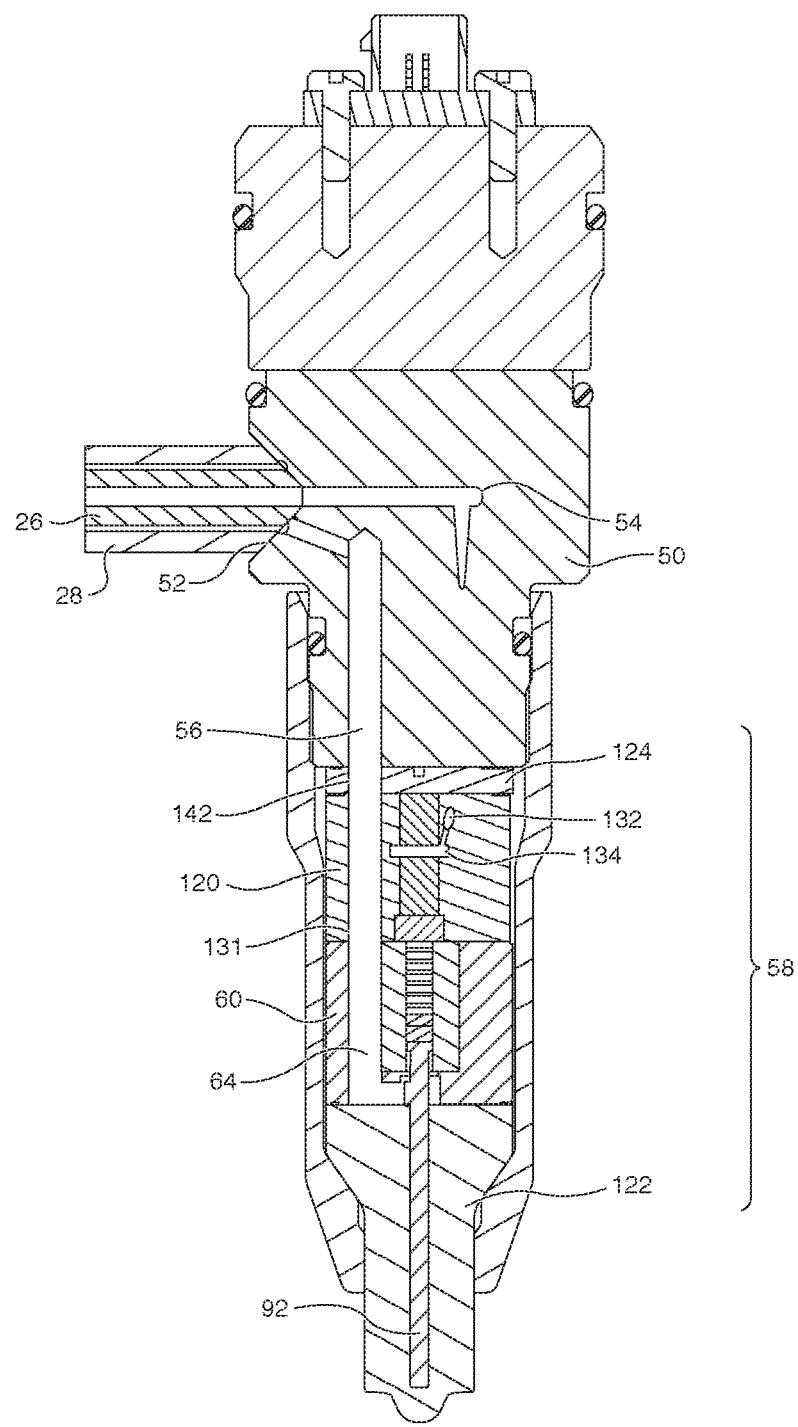
FIG. 2 is a cross section of a dual fuel injector according to a first embodiment.

Turning now to FIGS. 2 and 3, which depict the internal structure and fluid circuitry of injector 12 according to a first embodiment. In particular, an injector body 50 defines a coaxial dual fuel supply inlet 52. Dual fuel supply inlet 52 is configured to receive the concentric first and second quill tubes 26, 28. Injector body 50 further defines a diesel fuel supply passage 54 and a gaseous fuel supply passage 56 both of which fluidly connect to the dual fuel inlet 52. In the embodiment shown, first quill tube 26 delivers diesel to the dual fuel inlet 52 where it fluidly connects to diesel fuel supply passage 54. Similarly, second quill tube 28 delivers gaseous fuel to the dual fuel inlet 52, where it fluidly connects to gaseous fuel supply passage 56.

As shown in greater detail in FIG. 4, injector 12 further includes a nozzle assembly 58. The nozzle assembly 58 of this embodiment is commonly referred to as side-by-side, because of the way that the diesel check needle assembly 66 and the gaseous check needle assembly 68 are positioned. The nozzle assembly 58 includes a nozzle body 60 defining a diesel fuel cavity 62 and a gaseous fuel cavity 64. Diesel fuel cavity 62 is in fluid communication with diesel fuel supply passage 54. Similarly, the gaseous fuel cavity 64 is in fluid communication with the gaseous fuel supply passage 56. The diesel check needle assembly 66 may be a two part assembly having an upper portion 78 and a lower portion 80 operably coupled together. The lower portion 80 may include a head 82, which is disposed within a cavity 84 defined by the upper portion 78. Those skilled in the art will readily recognize that the diesel check needle assembly 66 could be a singular check needle unit. The diesel check needle assembly 66 may further include opening hydraulic surfaces 86 and closing hydraulic surfaces 88. The diesel check needle assembly 66 is disposed within the diesel fuel cavity 62 where it is almost completely surrounded by diesel fuel. Thus, diesel fuel can act on the opening hydraulic surfaces 86 and closing hydraulic surfaces 88 to respectively assist in the opening and closing of the diesel check needle assembly 66. The diesel check needle assembly 66 is biased toward a closed position by a biasing spring 70, which is also disposed within the diesel fuel cavity 62. In the closed position, the lower portion 80 of the diesel check needle assembly 66 at least partially blocks an at least one diesel injection orifice 72.

Similar to the diesel check needle assembly 66, the gaseous check needle assembly 68 may be a two part assembly having an upper portion 90 and a lower portion 92 operably coupled together. The lower portion 92 may include a head 94, which is disposed within a cavity 96 of the upper portion 90. Those skilled in the art will readily recognize that the gaseous check needle assembly 68 could be a singular unit. The gaseous check needle assembly 68 may further include opening hydraulic surfaces 98 and closing hydraulic surfaces 100. The gaseous check needle assembly is disposed within gaseous fuel cavity 64 where it is almost completely surrounded by gaseous fuel. Thus, gaseous fuel can act on the opening hydraulic surfaces 98 and the closing hydraulic surfaces 100 to respectively assist in the opening and closing of the gaseous check needle assembly 68. The gaseous check needle assembly 68 is biased toward a closed position by a biasing spring 74, which is also disposed in the gaseous fuel cavity 64. In the closed position, the lower portion 92 of the gaseous check needle assembly 68 at least partially blocks an at least one gaseous injection orifice 76.

The nozzle assembly 58 may also include an upper check guide 120, a lower check guide 122 and an orifice plate 124. The upper check guide 120 defines a diesel needle cavity 126 in which the upper portion 78 of the diesel check needle assembly 66 is disposed. The upper check guide 120 also defines a gaseous needle cavity 128 in which the upper portion 90 of the gaseous check needle assembly 68 is disposed. The diesel needle cavity 126 and the gaseous needle cavity 128 may be machined such that the respective upper portions 78, 90 may move freely. The movement of the upper portions 78, 90 is also assisted by the lubrication of the diesel fuel.

The upper check guide may also define a first orifice 130 that establishes fluid communication between the diesel fuel supply passage 54 and the diesel fuel cavity 62. Likewise, a second orifice 131, which establishes fluid communication between the gaseous supply passage and the gaseous fuel cavity, is also defined by the upper check guide 120. The first orifice 130 may further include a hydraulic lock assembly 132 wherein diesel fuel is diverted to the gaseous needle cavity 128. The hydraulic lock 132 further includes a ring cavity 134 that surrounds the upper portion 90 of the gaseous check needle assembly 68. Ring cavity 134 is positioned above the gaseous fuel cavity 64. Because the pressure of diesel fuel within the fuel system 10 is approximately 5 MPa higher than that of gaseous fuel, the hydraulic lock will prevent gaseous fuel from migrating up gaseous needle cavity 128 where is could potentially mix with diesel fuel.

As will be understood by those skilled in the art, the lower check guide 122 defines a gaseous cavity 136, wherein the lower portion 92 of the gaseous check needle assembly 68 is disposed. Likewise, lower check guide 122 also includes a diesel cavity 138, wherein the lower portion 80 of the diesel check needle assembly 66 is disposed. The gaseous cavity 136 and diesel cavity 138 may be machined such that the respective lower portions 80, 92 may move freely within the cavities. Moreover, friction may also limited because diesel fuel, which has a relatively high lubricity, acts as a lubricant as the gaseous check needle assembly 68 reciprocates in gaseous needle cavity 128.

An orifice plate 124 may be disposed above the upper check guide 120. Similar to the upper check guide 120, the orifice plate includes a first orifice 140. The first orifice 140 of the orifice plate 124 facilitates fluid communication between the diesel fuel supply passage 54 and the first orifice 130 of the upper check guide 120. The orifice plate 124 also includes a second orifice 142. The second orifice 142 facilitates fluid communication between the gaseous fuel supply passage 56 and the second orifice 131 of the upper check guide 120.

A diesel check needle control chamber 144 is defined by a bottom surface 146 of the orifice plate 124, an upper surface 148 of the upper portion 78 of the diesel check needle assembly 66, and an interior surface 150 of the diesel needle cavity 126 of the upper check guide 120. A gaseous check needle control chamber 152 is defined by the bottom surface 146 of the orifice plate 124, an upper surface 154 of the gaseous check needle assembly 68, and an interior surface 156 of the gaseous needle cavity 128 of the upper check guide 120.

The orifice plate 124 further includes a diesel z-orifice 158 and a gaseous z-orifice 160. The diesel z-orifice 158 establishes fluid communication between the diesel fuel supply passage 54 and the diesel check needle control chamber 144. The gaseous z-orifice 160 establishes fluid communication between the diesel fuel supply passage 54 and the gaseous check needle control chamber 152. The diesel z-orifice 158 and the gaseous z-orifice 160 may be in fluid contact with one another via a bathtub section 162 which may be carved out of the upper surface 164 of the orifice plate 124.

The orifice plate 124 further includes a diesel a-orifice 166 and a gaseous a-orifice 168. The diesel a-orifice 166 fluidly connects the diesel check needle control chamber 144 to the diesel control valve assembly 30 via a diesel check needle control line 170. The orifice plate 124 also includes a gaseous a-orifice 168. The gaseous a-orifice 168 fluidly connects the gaseous check needle control chamber 152 to the gaseous control valve assembly 32 via a gaseous check needle control line 174.

The diesel control valve assembly 30 and gaseous control valve assembly 32 control the operation of the injector 12. More specifically, the diesel control valve assembly 30 controls the injection of diesel fuel, and the gaseous control valve assembly 32 controls the injection of gaseous fuel. The diesel control valve assembly 30 is at least partially disposed within the injector body 50, and includes a control valve 102 coupled to an armature 104. The control valve 102 may be a two-way valve that moves between a closed position and an open position. Control valve 102 may be normally biased toward the closed position by a biasing spring 108 and piston 109. In the closed position, fluid communication between the diesel check needle control chamber 144 and a low-pressure drain 106 is blocked. When the control valve 102 is in the open position, fluid communication between the diesel check needle control chamber 144 and the low-pressure drain 106 is established. More specifically, diesel fuel from the diesel check needle control chamber 144 may travel up the diesel check needle control line 170, across the control valve 102, and out low pressure drain 106.

The diesel control valve assembly 30 further includes an electrical actuator 110. Electrical actuator 110 may be a solenoid that, when energized, creates an electromagnetic field that causes armature 104 and the coupled control valve 102 to lift by overcoming the downward forces applied by biasing spring 108 and piston 109. When this occurs, control valve 102 is moved to its open position and fluid communication between the diesel check needle control chamber 144 and the low pressure drain 106. When electrical actuator 110 is deenergized, the electromagnetic field dissipates and the downward forces applied by biasing spring 108 and piston 109 cause armature 104 and the coupled control valve 102 to return to their original closed position. In this closed position, fluid communication between the diesel check needle control chamber 144 and the low pressure drain 106 is blocked. Those skilled in the art will recognize that the configuration of the diesel control valve assembly 30 may be done in a variety of ways without departing from the scope of the present disclosure. For example, the control valve could be a three way valve, the electrical actuator may be of a piezo type, or multiple biasing springs or pistons could be employed.

Although the gaseous control valve assembly 32 is configured to control the injection of gaseous fuel, it too uses diesel fuel as the control medium. The gaseous control valve assembly 32 may also be at least partially disposed within the injector body 50. The gaseous control valve assembly 32 includes a control valve 112 coupled to an armature 114. The control valve 112 may be a two way valve that moves between a closed position and an open position. Control valve 112 may be normally biased toward the closed position by a biasing spring 116 and piston 117. In the closed position, fluid communication between the gaseous check needle control chamber 152 and the low-pressure drain 106 is blocked. When control valve 112 is in the open position, fluid communication between gaseous check needle control chamber 152 and the low-pressure drain 106 is established. More specifically, diesel fuel from the gaseous check needle control chamber 152 may travel up the gaseous check needle control line 174, across the control valve 112, and out low pressure drain 106.

The gaseous control valve assembly 32 further includes an electrical actuator 118. Electrical actuator 118 may be a solenoid that, when energized, creates an electromagnetic field that causes armature 114 and the coupled control valve 112 to lift by overcoming the downward forces applied by biasing spring 116 and piston 117. When this occurs, control valve 112 is moved to its open position and fluid communication between the gaseous check needle control chamber 152 and the low pressure drain 106 is established. When electrical actuator 118 is deenergized, the electromagnetic field dissipates and the downward forces applied by biasing spring 116 and piston 117 cause armature 114 and the coupled control valve 112 to return to their original closed position. In this closed position, fluid communication between the gaseous check needle control chamber 152 and the low pressure drain 106 is blocked. Those skilled in the art will recognize that the configuration of the gaseous control valve assembly 32 may be done in a variety of ways without departing from the scope of the present disclosure. For example, the control valve could be a three way valve, the electrical actuator may be of a piezo type, or multiple biasing springs or pistons could be employed.

The operation of injector 12 will now be explained. For ease of understanding, a diesel fuel injection will first be explained, followed by that of a gaseous injection. The opening and closing of the diesel check needle assembly 66 is controlled in part by the presence of high pressure diesel fuel in diesel fuel supply passage 54, the diesel fuel cavity 62, diesel check needle control chamber 144, and the diesel check needle control line 170. Biasing spring 70 also plays a role in the opening and closing of diesel check needle assembly 66. When an injection of diesel fuel is not desired, the electrical actuator 110 of the diesel control valve assembly 30 is not energized. Pressurized diesel fuel is delivered to injector 12 via a quill assembly 24. Diesel fuel, which is at a pressure higher than that of gaseous fuel, may be delivered via first tube 26. First tube 26 may be disposed within a second tube 28. Diesel fuel enters the injector 12 via a dual fuel inlet 52. As shown in FIGS. 1-3, dual fuel inlet 52 may be configured to receive diesel fuel from the inner or first tube 26 of quill assembly 24. However, those skilled in the art will recognize that the quill assembly 24 and the dual fuel inlet 52 may also both be configured to respectively deliver and receive diesel fuel via the outer or second tube 28 of the quill assembly 24. Once pressurized diesel fuel enters the dual fuel inlet 52, it is delivered to the diesel fuel cavity 62 via the diesel fuel supply passage 54. A portion of the diesel fuel from the diesel fuel supply passage 54 travels through the diesel z-orifice 158, diesel check needle control chamber 144, and diesel a-orifice 166 to back fill the diesel check needle control line 170. Because the electrical actuator 110 is deenergized, diesel fuel may not cross the control valve 102. Thus, diesel fuel also quickly back fills the diesel check needle control chamber 144. In this state, there are essentially three forces operating to keep the diesel check needle assembly 66 closed. The first force is the downward force applied by biasing spring 70. The second force is the downward force applied by the pressurized diesel fuel in the diesel check needle control chamber 144. The third force is the downward force applied by diesel fuel in the diesel fuel cavity 62 to the closing hydraulic surfaces 88 of the diesel check needle assembly 66. As long as the electrical actuator 110 is deenergized, these three forces are greater than the sum of the forces seeking to open the diesel check needle assembly 66. Thus, injection of diesel fuel is prevented.

When injection of diesel fuel is desired, the electrical actuator 110 of diesel control valve assembly 30 is energized, thus creating an electromagnetic field. The electro magnetic field attracts armature 104 and the coupled control valve 102. The attracting force of the electromagnetic field is sufficient to overcome the downward force of biasing spring 108, causing the armature 104 and control valve 102 to lift. As control valve 102 moves to its open position, fluid communication between the diesel check needle control chamber 144 and the low pressure drain 106 is established. Thus, the pressurized diesel fuel from the diesel check needle control chamber 144 travels through the diesel a-orifice, up the diesel check needle control line 170, across control valve 102, and out the low pressure drain 106. As this occurs, pressure within the diesel check needle control chamber 144 drops and the downward force caused by the pressure is reduced. Now, the overall downward forces applied to the diesel check needle assembly 66 are less than the upward forces applied by the diesel fuel to the opening hydraulic surfaces 86 applied to diesel check needle assembly. Thus, the diesel check needle assembly lifts and diesel fuel is injected via the at least one diesel injection orifice 72.

When it is desirable to stop the injection of diesel fuel, electrical actuator 110 is deenergized. As the electromagnetic field generated by electrical actuator 110 dissipates, the force of biasing spring 108 acts on piston 109 pushing control valve 102 downward. Thus, control valve 102 is returned to its closed position, wherein fluid communication between the diesel check needle control chamber 144 and the low pressure drain 106 is blocked. When this occurs, diesel fuel is once again allowed to fill the diesel check needle control line 170 and back fill the diesel check needle control chamber 144. Thus, pressure within the diesel check needle control chamber 144 increased. When this occurs, the downward forces applied to the diesel check needle assembly 66 are greater than the upward forces. The diesel check needle assembly 66 returns to its initial position, wherein the at least one diesel injection orifice 72 is blocked, thus ending the diesel injection event.

An injection of gaseous fuel is similar to that of diesel fuel. However, as will be seen, there are some important differences. For example, although gaseous fuel is being injected, diesel fuel plays a large role in the opening and closing of the gaseous check needle assembly 68. When an injection of gaseous fuel is not desired, electrical actuator 118 of the gaseous control valve assembly 32 is not energized. Pressurized gaseous fuel is delivered to the injector 12 via the second tube 28 of the quill assembly 24. Gaseous fuel enters the dual fuel inlet 52, wherein it is delivered to the gaseous fuel cavity 64 via the gaseous fuel supply passage 56. Diesel fuel, which enters the dual fuel inlet 52, is supplied to the gaseous check needle control line 174 via the diesel fuel supply passage 54, the gaseous z-orifice 160, the gaseous check needle control chamber 152, and the gaseous a-orifice 168. It will be understood by those skilled in the art that diesel fuel may be simultaneously be delivered to both the diesel z-orifice and gaseous z-orifice by supplying diesel fuel to a bathtub section 162 of the orifice plate 124. Due to the fact that the electrical actuator 118 is deenergized, biasing spring 116 and piston 117 work to keep control valve 112 in its closed position, thereby preventing diesel fuel from crossing control valve 112. Thus, diesel fuel quickly back fills the gaseous check needle control chamber 152. In this state, there are essentially three forces operating to keep the gaseous check needle assembly 68 closed. The first force is the downward force applied by biasing spring 74. The second force is the downward force applied by the pressurized diesel fuel in the gaseous check needle control chamber 152. The third force is the downward force applied by gaseous fuel in the gaseous fuel cavity 64 to the closing hydraulic surfaces 100 of the gaseous check needle assembly 68. As long as the electrical actuator 118 is deenergized, these three forces are greater than the sum of the forces seeking to open the gaseous check needle assembly 68. Thus, injection of gaseous fuel is prevented.

When injection of gaseous fuel is desired, the electrical actuator 118 of gaseous control valve assembly 32 is energized, thus creating an electromagnetic field. The electromagnetic field attracts armature 114 and the coupled control valve 112. The attracting force of the electromagnetic field is sufficient to overcome the downward of biasing spring 116 and piston 117, causing the armature 114 and control valve 112 to lift. As control valve 112 moves to its open position, fluid communication between the gaseous check needle control chamber 152 and the low-pressure drain 106 is established. Thus, pressurized diesel fuel from the gaseous check needle control chamber 152 travels through the gaseous a-orifice 168, up the gaseous check needle control line 174, across control valve 112, down gaseous drain line 176 and out low pressure drain 106. As this occurs, pressure within the gaseous check needle control chamber drops and the downward force caused by that pressure is reduced. At this point, the overall downward forces applied to the gaseous check needle assembly 68 are less than the upward forces applied by the gaseous fuel to the opening hydraulic surfaces 98 of the gaseous check needle assembly 68. Thus the gaseous check needle assembly 68 lifts and gaseous fuel is injected via the at least one gaseous injection orifice 76.

When it is desirable to stop the injection of gaseous fuel, electrical actuator 118 is deenergized. As the electromagnetic field generated by electrical actuator 118 dissipates, the force of biasing spring 116 acts on piston 117 pushing control valve 112 downward. Thus, control valve 112 is returned to its closed position, wherein fluid communication between the gaseous check needle control chamber 152 and the low pressure drain 106 is blocked. When this occurs, diesel fuel is once again allowed to fill the gaseous check needle control line 174 and back fill the gaseous check needle control chamber 152. Thus, pressure within the gaseous check needle control chamber 152 is increased. When this occurs, the downward forces applied to the gaseous check needle assembly 68 are greater than the upward forces. The gaseous check needle assembly 68 returns to its initial position, wherein the gaseous injection orifice 76 is blocked, thus ending the gaseous injection event.

As previously mentioned, the injection of gaseous fuel is largely controlled by diesel fuel moving into and out of the gaseous check needle control chamber 152. The selection of diesel fuel as a control medium is largely due to the fact that diesel fuel is much more viscous than gaseous fuels. Thus, diesel fuel acts as an excellent lubricant. This increased lubricity helps protect the sensitive surfaces of the gaseous control valve assembly 32. Those skilled in the art will also recognize that the same lubricity benefits also apply to the diesel control valve assembly 30.

The viscous nature of diesel fuel also has benefits with respect to injector tips. Gaseous fuels may cause excessive tip wear because of their low viscosity and low bulk modulus. This excessive wear can lead to tip failure, and ultimately failure of the injector. To combat this issue in the present injector 12, small amounts of diesel fuel are permitted to leak into the gaseous fuel cavity 64. This is accomplished through the hydraulic lock assembly 132. Diesel fuel pressure within fuel system 10 is higher than that of gaseous fuel. Ideally, the pressure difference is approximately 5 MPa. Because of this pressure difference, small amounts of diesel fuel delivered to the ring cavity 134 of the hydraulic lock assembly 132, seep into the gaseous fuel cavity 64. This small amount of diesel fuel lubricates the upper portion 90 of gaseous check needle assembly 68 as it reciprocates within gaseous needle cavity 128. Additionally, the diesel fuel helps to reduce wear of the check needle seat 178.

Industrial Applicability

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from diesel fuel rail 20.

As shown in FIGS. 5*a*-5*f*, which generically depict the injection volumes of diesel and gaseous fuel versus time, the disclosed fuel injectors have the capability of injecting diesel and gaseous fuel according to a variety of different shot modes. Preferably, the diesel charge of an injection event is approximately 3-5% of the overall injection charge of diesel and gaseous fuel.

Figure 5D:
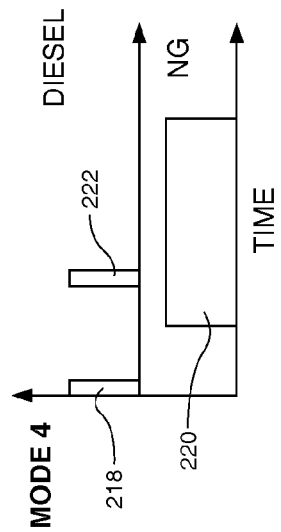
FIGS. 5a-5f are injection volume versus time plots of a variety of exemplary shot modes carried out by the disclosed dual fuel common rail injector.
Figure 5E:
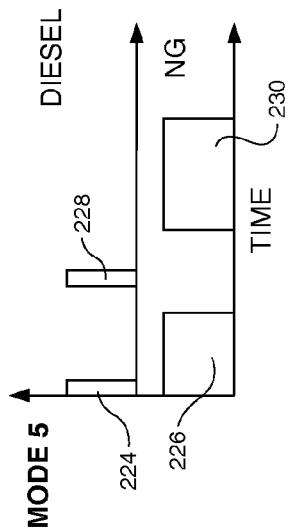
Figure 5F:
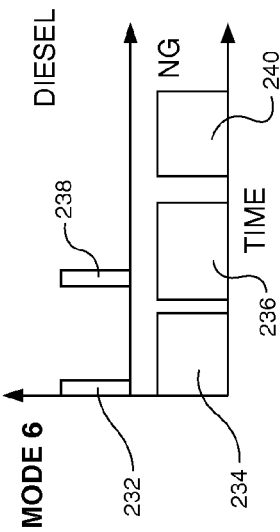
Figure 5A:
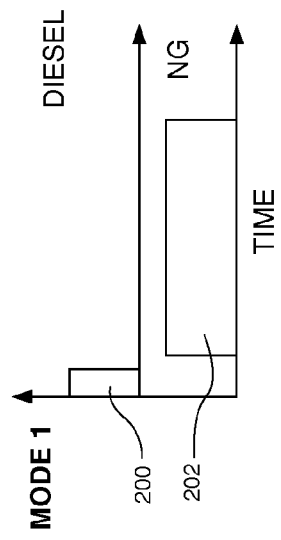
Figure 5B:
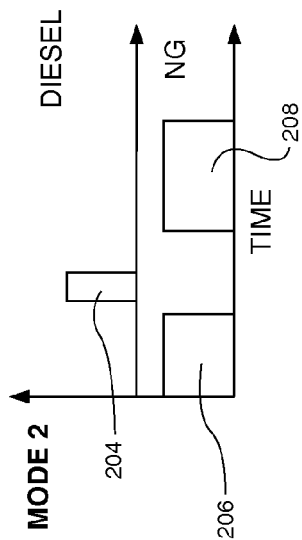
Figure 5C:
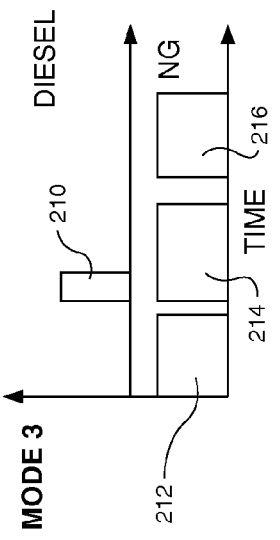

FIG. 5*a* shows a shot mode wherein the diesel charge 200 begins and ends the beginning of a large uninterrupted gaseous charge 202. Alternatively, as shown in FIG. 5*b*, the entire diesel charge 204 can come in between an initial gaseous charge 206, and a post gaseous charge 208. FIG. 5*c* shows a shot mode wherein the diesel charge 210 comes after an initial gaseous charge 212, but simultaneous with the beginning of a second gaseous charge 214. FIG. 5*c* also shows a third gaseous charge 216. In FIGS. 5*d*-5*f*, the diesel injection is split into two smaller and separate charges spaced apart by a period of time. For example, FIG. 5*d* shows an initial diesel charge 218 followed by the beginning of a single large gaseous charge 220, and wherein the second diesel charge 222 begins after the beginning of the gaseous charge 220, and ends prior to the end of the gaseous charge 220. FIG. 5*e* shows a shot mode wherein the initial diesel charge 224 and the initial gaseous charge 226 begin simultaneously. However, the initial gaseous charge 226 is longer in duration. The second diesel charge 228 occurs after the end of the initial gaseous charge 226. The second gaseous charge 230 occurs after the end of the second diesel charge 228. FIG. 5*f* once again shows an initial diesel charge 232 and initial gaseous charge 234 begin simultaneously. Again, the initial gaseous charge 234 is longer in duration than the initial diesel charge 232. A second gaseous charge 236 begins before the beginning of second diesel charge 238, and ends after the end of the second diesel charge 238. FIG. 5*f* also discloses a tertiary gaseous charge 240. Those skilled in the art will recognize that the shot modes disclosed in FIGS. 5*a*-5*f* are merely exemplary, and that the disclosed injector 12 can achieve any myriad of shot modes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A dual fuel injector comprising:
   an injector body defining a dual fuel inlet configured to receive high pressure diesel fuel and medium pressure gaseous fuel, a medium pressure gaseous supply passage, a high pressure diesel supply passage, at least one low pressure drain, a diesel check cavity, a gaseous check cavity, at least one diesel nozzle outlet, and at least one gaseous fuel nozzle outlet;
   a gaseous control valve assembly disposed at least partially within the injector body and having a control valve member that selectively allows fluid communication between the high pressure diesel supply passage and the at least one low pressure drain;

a diesel control valve assembly disposed at least partially within the injector body and having a control valve member that selectively allows fluid communication between the high pressure diesel supply passage and the at least one low pressure drain;

a diesel check disposed in the diesel check cavity and movable between a first diesel check position wherein the diesel check blocks fluid communication between the high pressure diesel supply passage and the at least one diesel nozzle outlet, and a second diesel check position wherein the diesel check at least partially unblocks fluid communication between the high pressure diesel supply passage and the at least one diesel nozzle outlet, and wherein the movement between the first diesel check position and the second diesel check position is controlled by the diesel control valve assembly;

a gaseous check disposed in the gaseous check cavity and movable between a first gaseous check position wherein the gaseous check blocks fluid communication between the medium pressure gaseous supply passage and the at least one gaseous nozzle outlet, and a second gaseous check position wherein the gaseous check at least partially unblocks fluid communication between the medium pressure gaseous supply passage and the at least one gaseous nozzle outlet;

a hydraulic lock in fluid communication with both the high pressure diesel supply passage and gaseous check cavity.

2. The dual fuel injector of claim 1, wherein the dual fuel inlet is further configured to receive high pressure diesel fuel and medium pressure gaseous fuel delivered in a coaxial fashion.

3. The dual fuel injector of claim 1, wherein the diesel check and the gaseous check are positioned side by side within the dual fuel injector.

4. The dual fuel injector of claim 1, wherein the diesel check includes a separate upper portion and lower portion operably connected to one another, and is biased toward the first diesel check position by a biasing spring.

5. The dual fuel injector of claim 1, wherein the gaseous check includes a separate upper portion and lower portion operably connected to one another, and is biased toward the first gaseous check position by a biasing spring.

6. The dual fuel injector of claim 1, wherein the gaseous control valve assembly further comprises an electrical actuator.

7. The dual fuel injector of claim 1, wherein the diesel control valve assembly further comprises an electrical actuator.

8. The dual fuel injector of claim 1, wherein the high pressure diesel fuel is at a pressure approximately 5 MPa higher than the medium pressure gaseous fuel.

9. The dual fuel injector of claim 1, wherein the high pressure diesel fuel is distillate diesel fuel, and the medium pressure gaseous fuel is liquefied natural gas.

10. A dual fuel common rail fuel system comprising:
a gaseous fuel source;
a diesel fuel source;
a medium pressure gaseous rail
a high pressure diesel rail
at least one gaseous pump configured to pressurize gaseous fuel from the gaseous fuel source to a medium pressure and deliver medium pressure gaseous fuel to the medium pressure gaseous rail;
at least one diesel pump configured to pressurize diesel fuel from the diesel fuel source to a high pressure and deliver high pressure diesel fuel to the high pressure diesel rail;

a quill configured to receive both medium pressure gaseous fuel from the medium pressure gaseous rail and high pressure diesel from the high pressure diesel rail;

a dual fuel injector configured to receive both medium pressure gaseous fuel and high pressure diesel fuel from the quill, and further comprising:
an injector body defining a dual fuel inlet configured to receive high pressure diesel fuel and medium pressure gaseous fuel, a medium pressure gaseous supply passage, a high pressure diesel supply passage, at least one low pressure drain, a diesel check cavity, a gaseous check cavity, at least one diesel nozzle outlet, and at least one gaseous fuel nozzle outlet;

a gaseous control valve assembly disposed at least partially within the injector body and having a control valve member that selectively allows fluid communication between the high pressure diesel supply passage and the at least one low pressure drain;

a diesel control valve assembly disposed at least partially within the injector body and having a control valve member that selectively allows fluid communication between the high pressure diesel supply passage and the at least one low pressure drain;

a diesel check disposed in the diesel check cavity and movable between a first diesel check position wherein the diesel check blocks fluid communication between the high pressure diesel supply passage and the at least one diesel nozzle outlet, and a second diesel check position wherein the diesel check at least partially unblocks fluid communication between the high pressure diesel supply passage and the at least one diesel nozzle outlet, and wherein the movement between the first diesel check position and the second diesel check position is controlled by the diesel control valve assembly;

a gaseous check disposed in the gaseous check cavity and movable between a first gaseous check position wherein the gaseous check blocks fluid communication between the medium pressure gaseous supply passage and the at least one gaseous nozzle outlet, and a second gaseous check position wherein the gaseous check at least partially unblocks fluid communication between the medium pressure gaseous supply passage and the at least one gaseous nozzle outlet;

a hydraulic lock in fluid communication with both the high pressure diesel supply passage and gaseous check cavity.

11. The dual fuel common rail system of claim 10, wherein the dual fuel inlet of the dual fuel injector is further configured to receive high pressure diesel fuel and medium pressure gaseous fuel delivered from the quill in a coaxial fashion.

12. The dual fuel common rail system of claim 10, wherein the diesel check and the gaseous check are positioned side by side within the dual fuel injector.

13. The dual fuel common rail system of claim 10, wherein the diesel check includes a separate upper portion and lower portion operably connected to one another, and is biased toward the first diesel check position by a biasing spring.

14. The dual fuel common rail system of claim 10, wherein the gaseous check includes a separate upper portion and lower portion operably connected to one another, and is biased toward the first gaseous check position by a biasing spring.

15. The dual fuel common rail system of claim 10, wherein the gaseous control valve assembly further comprises an electrical actuator.

16. The dual fuel common rail system of claim 10, wherein the diesel control valve assembly further comprises an electrical actuator.

17. The dual fuel common rail system of claim 10, wherein the high pressure diesel fuel is at a pressure approximately 5 MPa higher than the medium pressure gaseous fuel.

18. The dual fuel common rail system of claim 10, wherein the high pressure diesel fuel is distillate diesel fuel and the medium pressure gaseous fuel is liquefied natural gas.

* * * * *